United States Patent [19]
Reccius et al.

[11] Patent Number: 6,123,489
[45] Date of Patent: Sep. 26, 2000

[54] DRILLING TOOL FOR MACHINE TOOLS AND METHOD OF PRODUCING THE SAME

[75] Inventors: Helmut Reccius, Gummersbach; Gerhard Stolz, Ingersheim, both of Germany

[73] Assignee: Komet Praezisionswerkzeuge Robert Breuning GmbH, Besigheim

[21] Appl. No.: 09/155,502

[22] PCT Filed: Feb. 20, 1997

[86] PCT No.: PCT/EP97/00806

§ 371 Date: Sep. 25, 1998

§ 102(e) Date: Sep. 25, 1998

[87] PCT Pub. No.: WO97/35681

PCT Pub. Date: Oct. 2, 1997

[30] Foreign Application Priority Data

Mar. 27, 1996 [DE] Germany .............................. 196 12 104

[51] Int. Cl.[7] ..................................................... B23B 51/02
[52] U.S. Cl. ............................ 408/59; 408/144; 408/200; 408/230; 76/108.1
[58] Field of Search .................................. 408/57, 59, 67, 408/144, 200, 202, 230, 713; 76/108.1, 108.6, 115

[56] References Cited

U.S. PATENT DOCUMENTS

| | | | |
|---|---|---|---|
| 1,927,871 | 9/1933 | Irwin et al. | 408/67 |
| 3,040,605 | 6/1962 | Andreasson | 408/226 |
| 3,365,987 | 1/1968 | Heller et al. | 408/226 |
| 3,564,948 | 2/1971 | Pomernacki | 408/226 |
| 4,123,193 | 10/1978 | Hill | 408/202 |

FOREIGN PATENT DOCUMENTS

| | | | |
|---|---|---|---|
| 2461750 | 7/1976 | Germany | 408/226 |
| 3341507A1 | 5/1985 | Germany . | |
| 4003257C2 | 8/1991 | Germany . | |
| 4033877A1 | 4/1992 | Germany . | |
| 4205007A1 | 8/1993 | Germany . | |
| 19522141A1 | 2/1996 | Germany . | |

*Primary Examiner*—Daniel W. Howell
*Attorney, Agent, or Firm*—Flynn, Thiel, Boutell & Tanis, P.C.

[57] ABSTRACT

A drilling tool includes a tool head having at least one chip groove and a tool shank. A slotted sleeve is placed on the tool shank and closely surrounds the chip groove. The edges adjacent the slot lie on solid material of the tool shank. The chip grooves and the sleeve form channels for carrying away the chips removed at the workpiece machining base. Owing to the slot, the sleeve can be gently spread apart and pushed onto the tool shank from the end having the enlarged tool head.

32 Claims, 6 Drawing Sheets

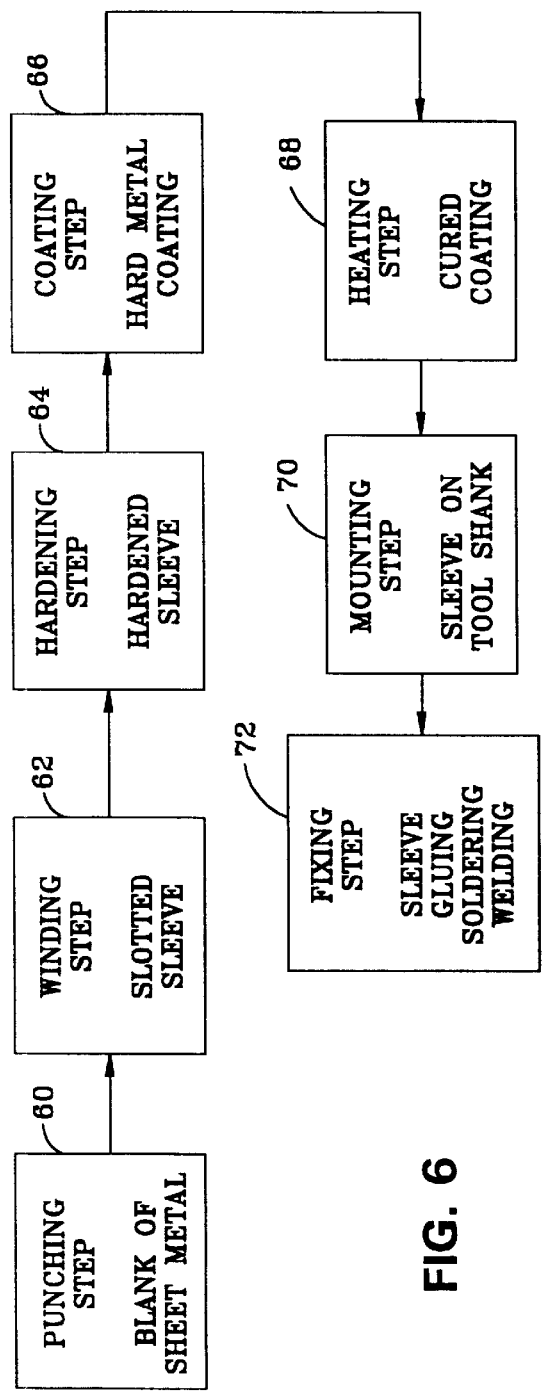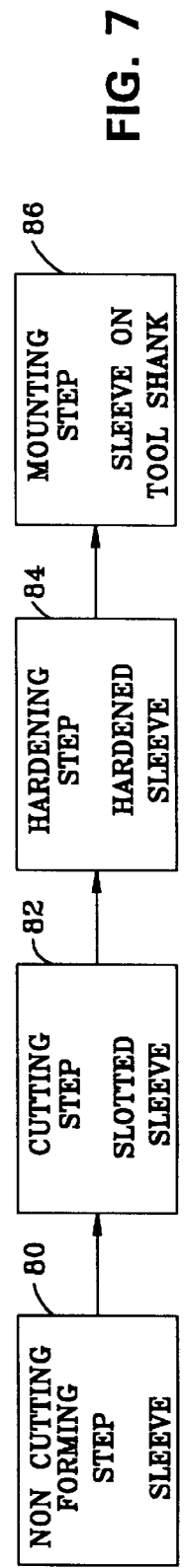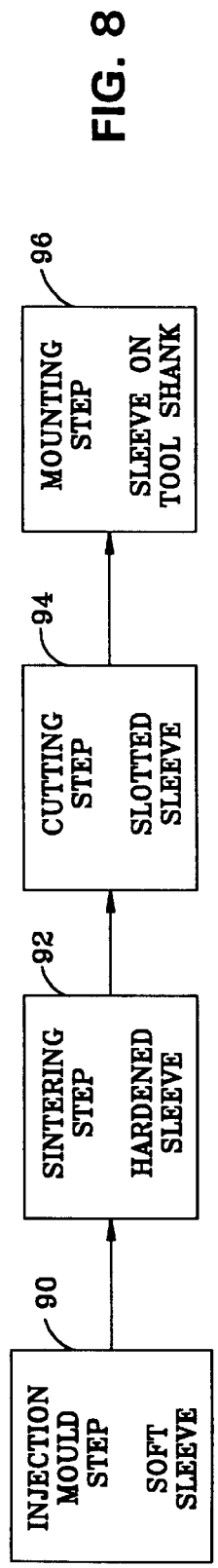
FIG. 6
FIG. 7
FIG. 8

US 6,123,489

DRILLING TOOL FOR MACHINE TOOLS AND METHOD OF PRODUCING THE SAME

FIELD OF THE INVENTION

The invention is related to a drilling tool for machine tools, comprising a tool head having at least one cutting edge, a tool shank joining the tool head and being adapted to be clamped in a tool holder of the machine tool with an end opposed to the tool head, at least one straight or helical chip groove formed into the surface of the shank and extending from the tool head in the direction of chip flow along at least part of the length of the shank, and a sleeve encompassing the tool shank and thereby covering the chip groove at least over a part of its length under formation of a closed chip channel. The invention is further related to a Method for manufacturing such a drilling tool.

BACKGROUND OF THE INVENTION

Drilling tools of the type described above are used for either solid drilling or for boring, profile facing or spot facing of predrilled bores. When drilling into solid material or when finishing pocket bores, the removal of chips may be aided by the use of a coolant and lubricant which emerges from the shank tip at a high pressure and washes the chips out of the bore by way of the chip groove. When the chip grooves are radially open, the chips which are forced radially outwards due to the centrifugal force of the tool rotating within the bore travel mainly along the wall of the bore. In pre-drilled bores, in the walls of which recesses such as pockets or cross bores are present, there is the disadvantage that the chips enter the recesses and cannot flow out anymore. The chips then have to be removed in a time consuming further step.

In order to avoid this disadvantage it is known (DE-A-40 33 877) in a drilling tool of the type described above to provide the tool shank with a close-fitting sleeve which extends from the tool head in the direction of the clamped end. The chip grooves and the inner wall of the sleeve thereby delimit channels through which the chips created in the drilling process are removed. Since the tool head radially protrudes over the circumference of the tool shank and therefore has a larger diameter than the inner diameter of the sleeve, in the known drilling tool the sleeve can only be mounted on the tool shank from the clamping end. In drills having a reinforced shank and in stepped drills the fitting of such a sleeve is not possible at all.

Based on this it is the object of the invention to develop a drilling tool and a method of production thereof, with which closed channels for removing chips can be provided for different types of drilling tools.

SUMMARY OF THE INVENTION

The solution according to the invention is based on the idea that the sleeve and/or the tool are designed such that the sleeve can be mounted on the tool shank from the side of the drill tip, in spite of the tool head having a larger diameter than the tool shank.

In order to achieve this it is proposed according to a first variant of the invention that the sleeve has a slot extending over the entirety of its length. The slot makes it possible to spread the sleeve apart so far during mounting that it may be pushed over the thickened tool head and fastened thereto in a tightly fitting manner. The sleeve therefore expediently consists of a resilient material, preferably of a spring steel. In order to ensure a secure positioning, it is of advantage when the sleeve lies against the tool shank with its edges which delimit the slot in a surface region away from the at least one chip groove. In the case of a helical drill these edges rest on the raised helix turns between the sunk chip grooves.

The slotted sleeve may be clamped onto the tool shank in a friction-fitting manner and/or be affixed to the tool shank in an integral manner by soldering, glueing or welding. In the latter case the sleeve adds to the torsional and flexural stability of the tool as a load carrying member.

In order to prevent an axial movement of the sleeve on the tool shank, the tool head has an axial shoulder acting as a stop for the sleeve, which shoulder is oriented in the direction of chip flow. The sleeve may additionally be connected to the tool shank in a circumferential direction in a form-fitting manner. To this end, it expediently comprises at its one end at least one projection which engages a corresponding recess of the stop shoulder. The drilling tool may also be clamped such that the sleeve is retained by the tool holder, usually a chuck, on the machine side.

When the drilling tool is formed to be a stepped drill, the tool shank of which has at least two shank sections of different diameter with continuous chip grooves, wherein at least one further cutting edge is arranged in the stepped region between the two shank sections, the sleeve may extend over at least one of the shank sections. In order to obtain a closed chip channel, the sleeve is comprised of at least two cylindrical sleeve sections having different diameters, though, which are disposed at an axial distance from one another and which are connected to each other by means of webs which extend over the chip grooves in the stepped region between two shank sections.

A further preferred embodiment of the invention provides that the slot of the sleeve is subsequently closed off by addition of material, for instance during the soldering or welding to the tool shank.

With the drilling tool according to the invention the chips stemming from the bottom of the bore can be pushed out through the chip channel by the pressure of following chips. The drilling tool according to the invention is preferably used in conjunction with a suction device, though, which is either integrated into the tool holder on the machine side or mounted therein.

An advantageous or alternative embodiment of the invention provides that the tool head is adapted to be removed from the tool shank for mounting or exchanging the sleeve. In this case mounting a sleeve which is not slotted from the side of the tip is possible.

A further advantageous or alternative embodiment of the invention therefore provides that the tool shank, together with the sleeve (10), is adapted to be mounted in the region of its clamping-side end in a suction device on the machine side. By this it is achieved that the chip channel merges into a chip removal conduit of the suction device.

In order to improve the chip removal it is proposed according to an advantageous embodiment of the invention that the tool shank comprises at least one supply channel for pressurized air and/or a coolant and lubricant, which channel extends up to the tool head and communicates threat in the region of the cutting edge with the chip channel. The pressurized air or the coolant and lubricant is then led through the chip channel to the suction device together with the chips. The pressurized air or the coolant and lubricant is supplied either by way of the suction device or centrally by way of a spindle of the machine tool. The chip removal is also made easier when the at least one chip groove has a partial-circular cross section which is complemented by the sleeve to form an essentially circular chip channel.

For the manufacturing of the drilling tool a number of possibilities exist. A first variant of the method consists in that a blank of unhardened sheet metal corresponding to a development of the sleeve is wound onto a mandrel geometrically corresponding to the tool shank under formation of the slotted sleeve and is resiliently hardened, and that the sleeve prepared in this manner is pushed over the tool head under widening of the slot and clamped onto the tool shank.

According to a second variant of the method a sheet metal is formed in a non-cutting manner over a die or mandrel geometrically corresponding to the tool shank under formation of the sleeve, and the sleeve thus formed is mounted on the tool shank. In this, the sheet metal is preferably either deep-drawn or extruded.

A third method provides that a pasty, hard metal-containing substance is injected into an injection mould corresponding to the sleeve, and that the sleeve thus formed is then sintered and mounted on the tool shank.

In the two latter variants of the method the sleeve is expediently cut open under formation of the slot and is preferably resiliently hardened, so that the sleeve thus formed may be pushed over the tool head under widening of the slot and clamped onto the tool shank.

In order to improve the glide properties of the sleeve surface, the sleeve can be surface coated with a pasty hard metal material and heated to cure the coating.

In all variants of the method the sleeve can be integrally connected to the tool shank, for example by glueing, soldering or welding.

BRIEF DESCRIPTION OF THE DRAWING

In the following the invention is further described with reference to embodiments schematically shown in the drawing, in which:

FIG. 1b shows a development of the slotted sleeve according to FIG. 1a;

FIG. 4c shows a development of the slotted sleeve according to FIG. 4a;

FIG. 6 shows a method for manufacturing a drilling tool including making a blank of sheet metal into a slotted sleeve secured on a tool shank;

FIG. 7 shows a method for manufacturing a drilling tool including forming a sleeve in a non-cutting manner and mounting the sleeve on a tool shank;

FIG. 8 shows another method for manufacturing a drilling tool including using a mold to form a sleeve and mounting the sleeve onto a tool shank.

DETAILED DESCRIPTION

Figure 1A:
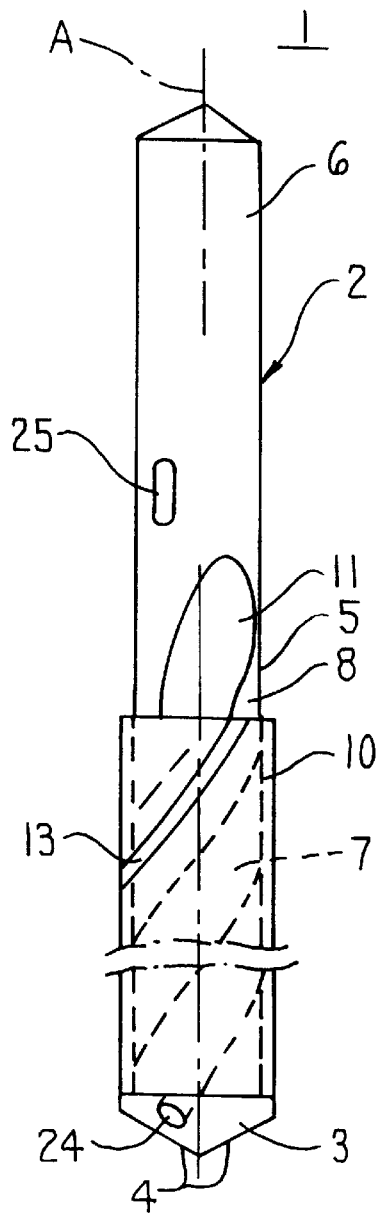
FIG. 1a shows a partially cut view of a drilling tool having a slotted sleeve disposed on the tool shank.
Figure 1B:
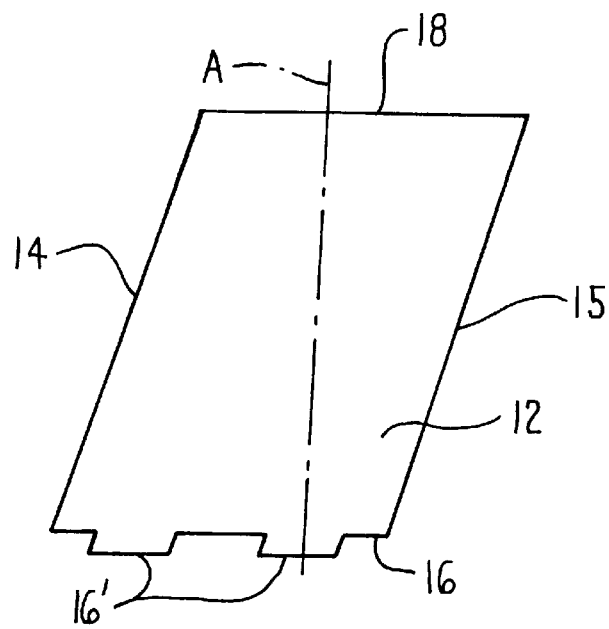
Figure 2:
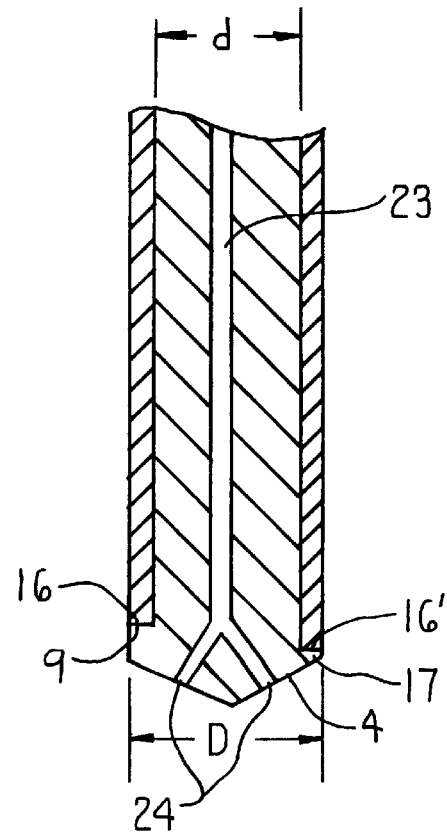
FIG. 2 shows a longitudinal section through the drilling tool of FIG. 1a in the region of the tool head.

The drilling tool shown in FIG. 1 and 2 has as a core a helical drill 2 which comprises a drill head 3 with two angled cutting edges 4 as well as a tool shank 5 following the tool head 3. The tool shank 5 comprises two helical chip grooves 7 and ribs 8 disposed in between the chip grooves 7, which extend over a part of the tool shank from the tool head 3 in the direction of chip flow. The drilling tool 1 can be clamped in the chuck of a machine tool at its groove-free shank end 6.

The tool head 3 has an outer diameter D that is slightly larger than the outer diameter d of the tool shank 5, so that a step or shoulder 9 is formed between the tool head 3 and the tool shank 5.

A slotted sleeve 10 is disposed on the tool shank 5. The sleeve 10 is connected to the tool shank 5 in a form- and friction-fitting manner and, if needed, also an integral manner. It is supported with its edge 16 on the shoulder 9 of the tool head 3 and terminates with its opposing edge 18 just before a run-out 11 of the chip grooves 7 which is directed toward the clamping end 6 of the tool shank 5. The sleeve 10 has at most the same outer diameter D as the drill head 3, but may also have a slightly smaller diameter.

The sleeve 10 is expediently fabricated from a steel sheet metal blank 12 (FIG. 2) consisting of resilient material, wherein the development of the sleeve according to FIG. 1b results in a slanted parallelogram. For purposes of orientation the longitudinal axis A of the drilling tool is shown in FIG. 1b. The angles of the sides 14, 15 of the sheet metal blank 12 with respect to the axis A correspond to the angle of ascent of the helical rib 8. For the production of the sleeve 10 the sheet metal blank 12 is rolled over a mandrel, so that narrow slot 13 results, which is delimited by the edges 14, 15 of the sheet metal blank 12. The sleeve 10 is positioned on the tool shank 5 in such a manner that the slot 13 runs parallel to one of the ribs 8, wherein the edges 14, 15 delimiting the slot 13 rest on the rib 8.

The sleeve 10 has at its lower edge 16 two projections 16', which engage corresponding recesses 17 in the shoulder 9 in a form-fitting manner and which thereby hold the sleeve on the tool shank in a non-rotational manner. For a further improvement in this respect the sleeve 10 can be welded to the tool shank 5 with its edges 14 and 15.

Figure 3:
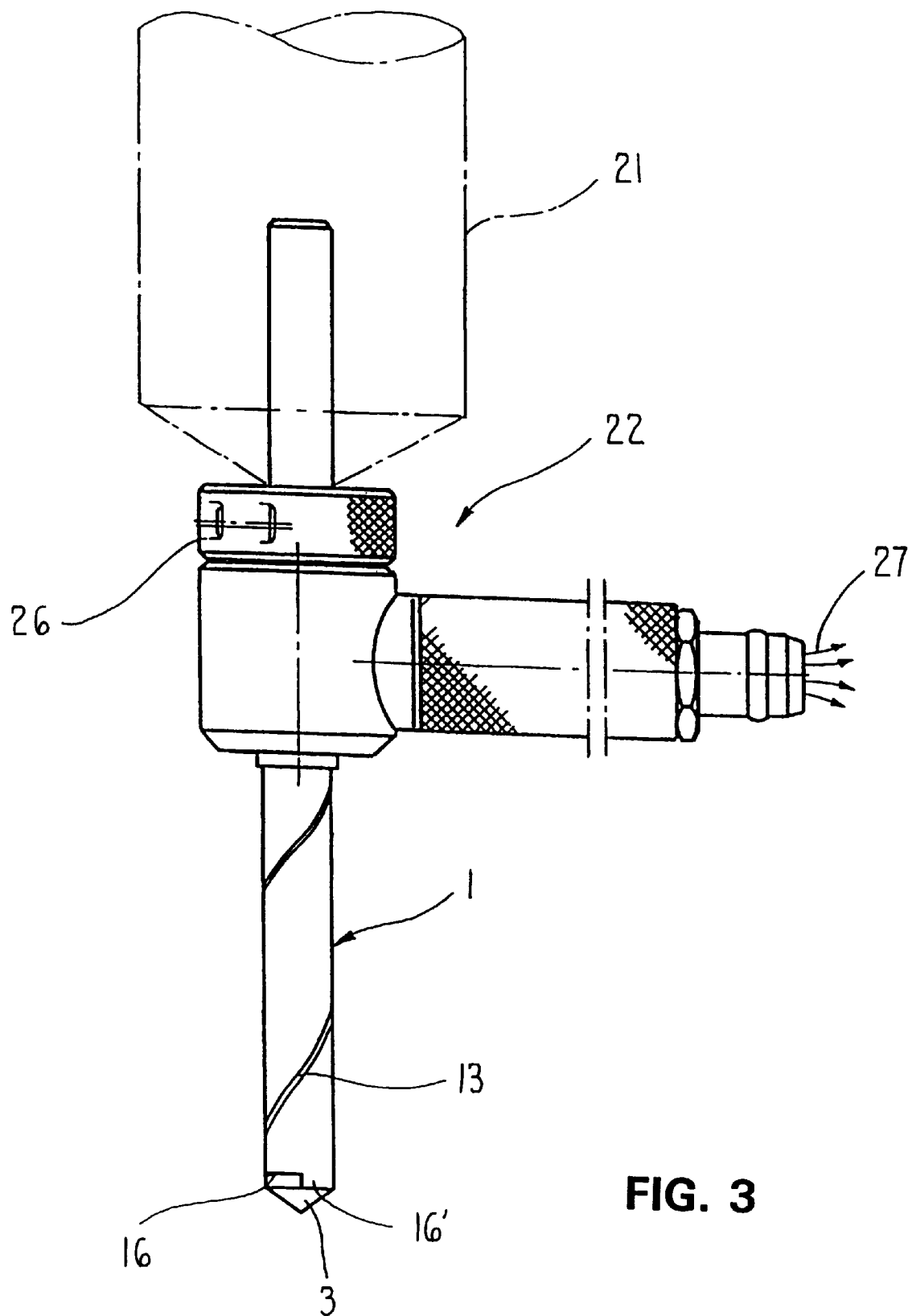
FIG. 3 shows a side view of the drilling tool, which is clamped into a machine tool and connected to a suction and scavaging device.

As shown in FIG. 3, the drilling tool 1 can be clamped in a chuck 21 of a machine tool. In the embodiment shown in the figure, there is additionally provided a suction and scavaging device 22 on the machine, into which the drilling tool 1 together with the sleeve 10 may be clamped. During drilling, the cutting edges 4 remove chips from the bottom of a bore in a workpiece (not shown), which chips are continuously sectioned off in the direction of the arrows 27 by way of the chip grooves 7, when the suction device 22 is switched on. The sleeve 10 prevents that the chips contact the bore wall of the workpiece and thereby degrade the quality of the bore.

In order to ensure a dependable removal of the chips through the chip channels formed between the chip grooves 7 and the sleeve 10 without the danger of congestion, it is expedient to provide the cutting edges 4 with chip breaking and/or chip forming edge and face contours to facilitate the creation of short and curly chips.

As can be seen especially in FIG. 1a and 2, the drilling tool comprises a feed channel 23 which is adapted to be subjected to pressurized air or a coolant and lubricant by way of an opening 25, which feed channel branches off in the region of the tool head 3 and exits to the outside at nozzles 24 at the front end of the tool head 3. The feed channel 23 communicates with a distributor 26 by way of the nozzle 25 in the region of the suction and scavaging device.

In principle it is also possible to lead the feed channel 23 up to the clamping side end 26 of the drill shank and to subject it there with pressurized air or a coolant and lubricant by way of the clamping chuck.

Figures 4A, 4B:
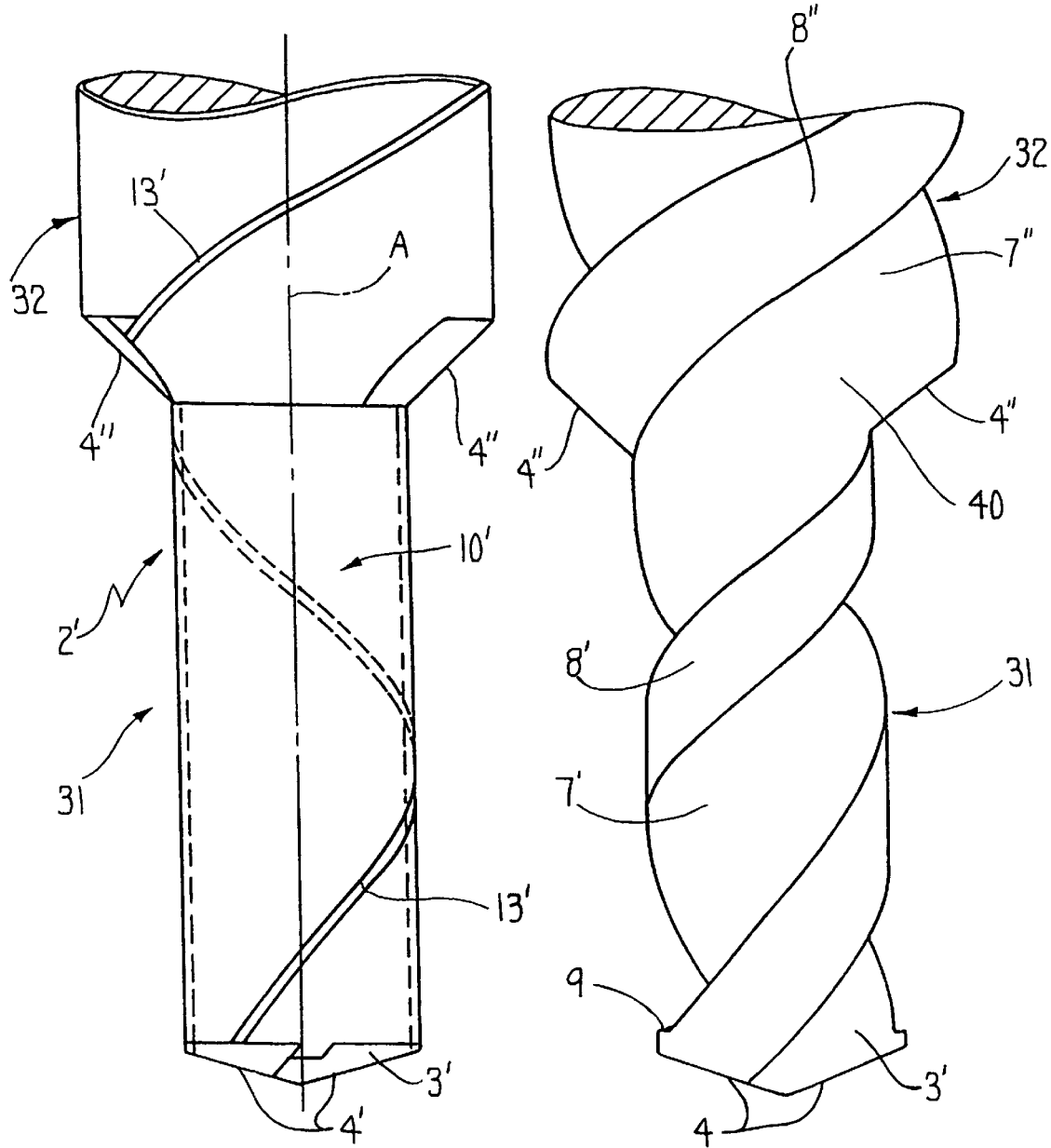
FIG. 4a shows a side view of a stepped drill with a slotted sleeve.
FIG. 4b shows a side view of the stepped drill of FIG. 4a with the sleeve removed.
Figure 4C:
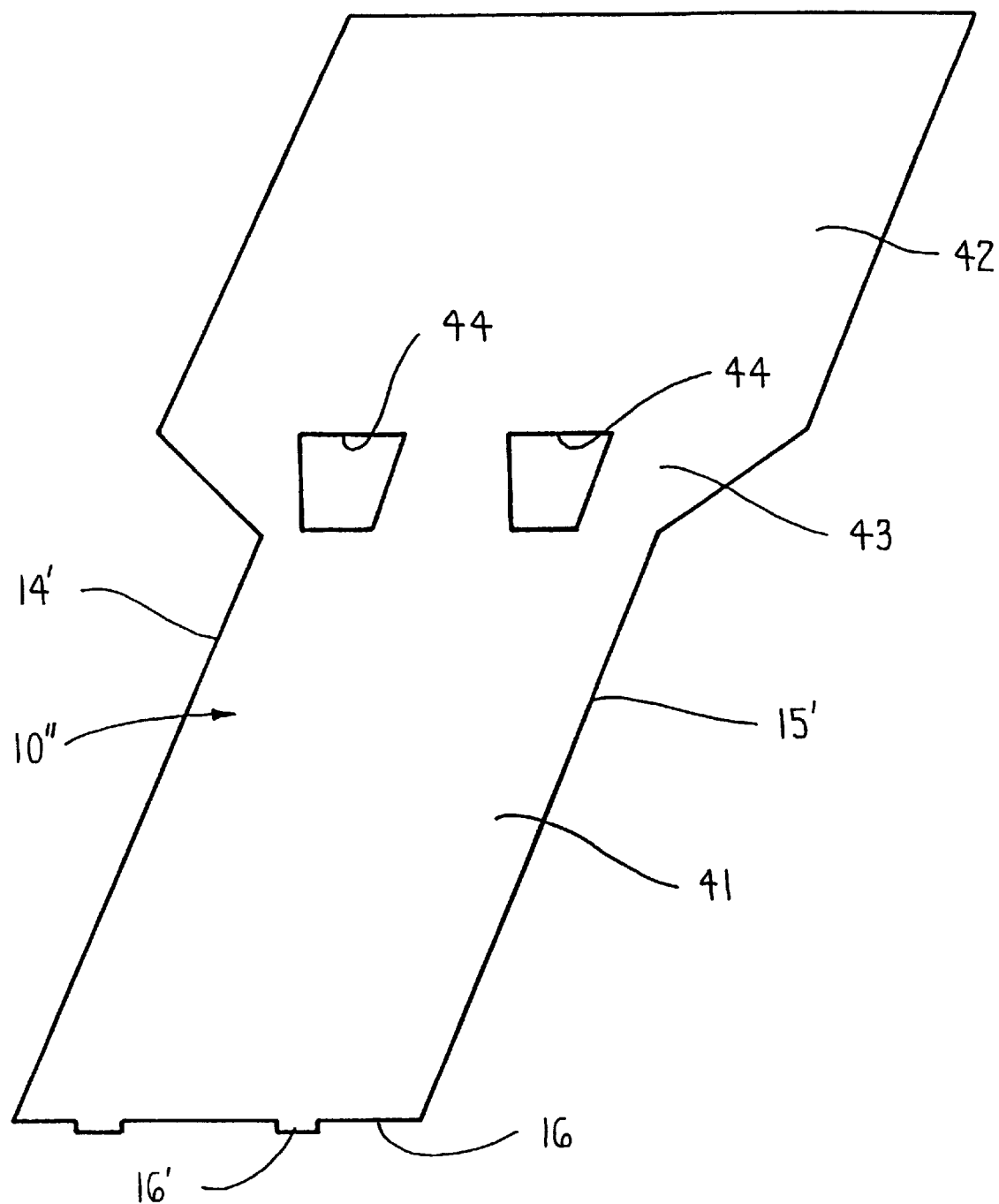

The stepped drill 2' shown in FIG. 4a comprises a pilot drill 31 having a smaller diameter and a main drill 32 having a larger diameter. The pilot drill 31 comprises a stepped tool head 3' with corresponding cutting edges 4', while the main drill comprises two cutting edges 4" in the conical intermediate region 40 (FIG. 4b). The chip grooves 7' and the interposed ribs 8' of the pilot drill 31 directly merge into the helical chip grooves 7" and the ribs 8" of the main drill 32 in the intermediate region 40. A slotted sleeve 10' having slot 13' is pushed over the tool head 3' and the conical intermediate region 40 onto the the shank of the pilot drill 31 and of the main drill 32 by spreading apart the sleeve, and is affixed thereto by clamping and/or welding. As can be seen from FIG. 4c, the slotted sleeve is fabricated from a blank 10''', which comprises a narrow portion 41 for the pilot drill 31 and a wide portion 42 for the main drill 32, which are joined to each other by an intermediate portion 43. The openings 44 in the intermediate portion 43 are provided for the through-passage of the cutting edges 4" of the main drill 32. The plane blank 10'' is wound around a mandrel geometrically corresponding to the stepped drill, so that the edges 14', 15' delimiting the slot 13' contact each other with their faces. In this state the sleeve 10', which is made of steel sheet metal, is resiliently hardened, so that it may be clamped onto the stepped drill such that the slot edges 14', 15' are supported on the solid material of one of the ribs 8' and, if so desired, can be welded thereto.

Figure 5:
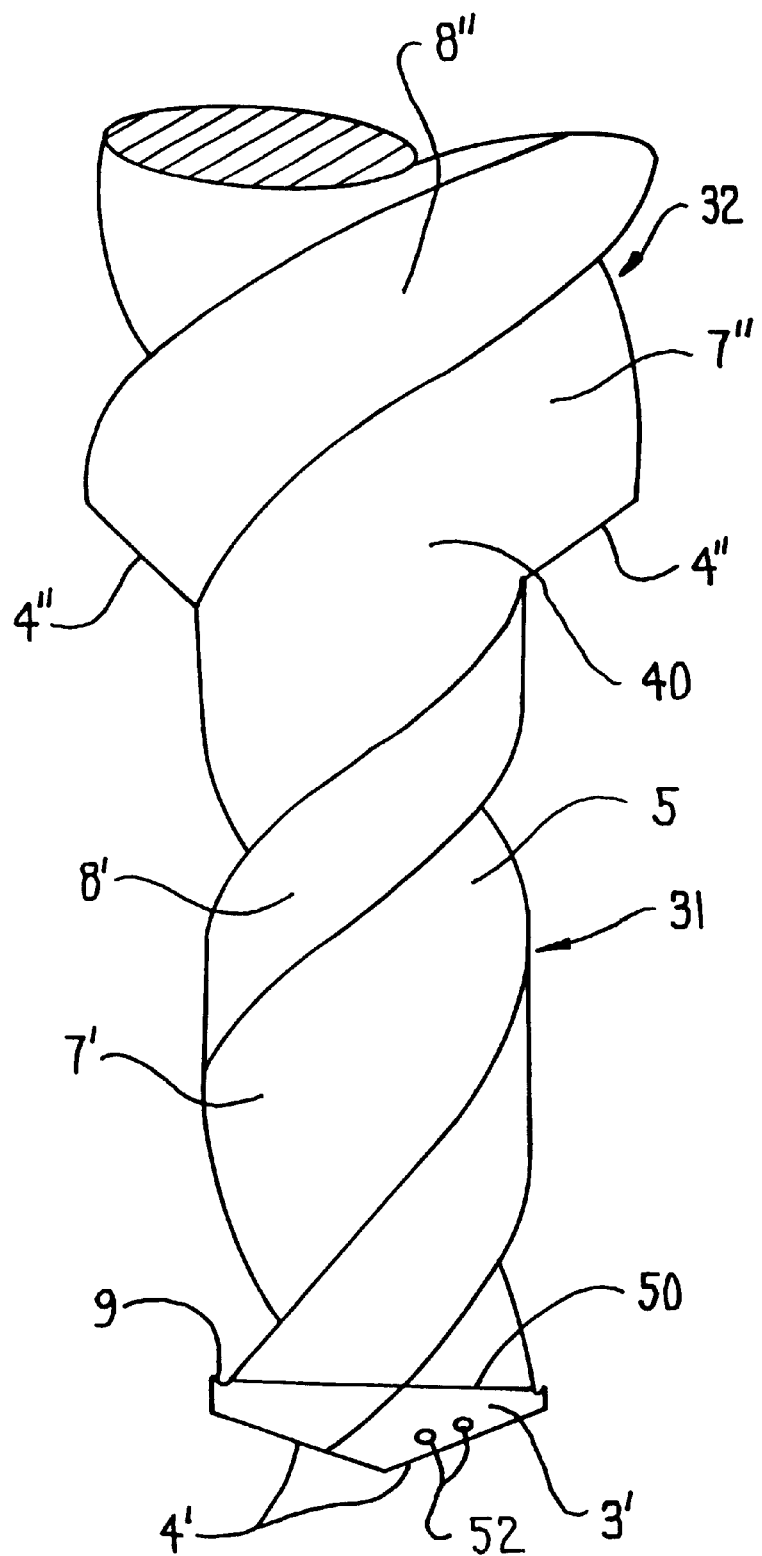
FIG. 5 shows a side view of a stepped drill having a removable tool head and chip breaking elevations.

FIG. 5 shows a stepped drill with the sleeve removed. The tool head 3' is removable from the tool shank 5 at the separating point 50. Further, chip-breaking or chip-forming elevations or chip flank contours 52 are arranged in the area of one of the cutting edges 4' on the removable tool head 3' shown in FIG. 5. This arrangement enables the tool head to be removed from the tool shank 5 for mounting or exchanging of the sleeve. The chip breaking or forming elevations or chip flank contours 52 can create short and curled chips which fit through the chip channel of the drilling tool.

FIG. 6 illustrates a method for manufacturing a drilling tool including a punching step 60 that forms a blank of unhardened sheet metal corresponding to the sleeve. At winding step 62, the sheet metal is wound to form a slotted sleeve 10. A hardening step 64 resiliently hardens the slotted sleeve. At coating step 66, a metal coating is placed onto the sleeve. Heating step 68 then cures the coating on the sleeve. At mounting step 70 the sleeve is mounted to the tool shank. At fixing step 72, the sleeve is fixed on the tool shank.

In a variant of the method shown in FIG. 6, FIG. 7 illustrates a non-cutting forming step 80 for forming the sleeve 10. At cutting step 82 a slot is formed in the sleeve. The sleeve is then resiliently hardened at hardening step 84 and mounted on the tool shank at mounting step 86.

FIG. 8 shows another variant for the method of manufacturing a drilling tool. At an injection mold step 90, a mold receives a pasty, hard metallic-containing substance corresponding to the sleeve 10. The sleeve thus formed is then sintered at a sintering step 92. At a cutting step 94, a slot is cut into the sleeve. Then at a mounting step 96, the sleeve is mounted on a tool shank.

These methods all perform the functions of forming a slotted sleeve and integrally connecting the sleeve to the tool shank.

In summary the following is to be stated: The invention relates to drilling tool for machine tools, comprising a tool head 3 and a tool shank 5 having at least one chip groove. A slotted sleeve 10 is placed onto the tool shank in a tightly encompassing manner wherein the edges 14, 15 delimiting the slot 13 rest on solid material of the tool shank 5. The chip grooves 7 and the sleeve 10 form channels for removing chips created at the bottom of a bore in a workpiece. Due to the slot 13 the sleeve 10 may be mounted onto the tool shank 5, by a slight spreading apart of the sleeve, from the side of the thickened tool head 3.

What is claimed is:

1. A drilling tool for machine tools, comprising a tool head having at least one cutting edge, a tool shank joining the tool head and adapted to be clamped in a tool holder of the machine tool with an end opposed to the tool head, at least one straight or helical chip groove formed into the surface of the shank and extending from the tool head in the direction of chip flow along at least part of the length of the shank, and a sleeve encompassing the tool shank and thereby covering the chip groove at least over a part of its length under formation of a closed chip channel, wherein the sleeve includes a slot extending over the entirety of its length.

2. The drilling tool of claim 1, wherein the sleeve lies against the tool shank with its edges which delimit the slot in a surface region away from the at least one chip groove.

3. The drilling tool of claim 1, wherein the sleeve is adapted to be elastically spread apart, increasing its diameter and broadening the slot.

4. The drilling tool of claim 1, wherein the sleeve comprises a resilient material.

5. The drilling tool of claim 1, wherein the sleeve consists of a sintered material.

6. The drilling tool of claim 1, wherein the tool head has a larger outer diameter than the tool shank.

7. The drilling tool of claim 1, wherein the tool head has a stop shoulder for the sleeve, which is oriented in the direction of chip flow.

8. The drilling tool of claim 1, wherein the cutting edge has a rotary diameter which is larger than the outer diameter of the sleeve.

9. The drilling tool of claim 1, wherein the sleeve is affixed to the tool shank in one of a form-fitting, friction-fitting or integral manner.

10. The drilling tool of claim 1, wherein the sleeve is soldered, glued, or welded to the tool shank at least in the region of the slot.

11. The drilling tool of claim 1, wherein the slot is helically shaped.

12. The drilling tool of claim 1, wherein the slot is closed by application of material.

13. The drilling tool of claim 1, wherein the sleeve has on at least one of its inner and outer surfaces a coating of hard metal.

14. The drilling tool of claim 1, wherein the sleeve is connected to the tool shank in a circumferential direction in a form-fitting manner.

15. The drilling tool of claim 7, wherein the sleeve comprises at its one end at least one projection which engages a corresponding recess of the stop shoulder.

16. The drilling tool of one of claim 1, wherein the tool shank comprises at least two shank sections having different diameters and continuous chip grooves, so that at least one further cutting edge is disposed in a stepped region between the two shank sections, and the sleeve extends over at least one of the shank sections.

17. The drilling tool of one of claim 16, wherein the sleeve is comprised of at least two cylindrical sleeve sections having different diameters, which are disposed at an axial distance from one another.

18. The drilling tool of claim 17, wherein in that the sleeve sections are connected to each other by means of webs which extend over the chip grooves in the stepped region between two shank sections.

19. The drilling tool of claim 1, wherein the tool shank, together with the sleeve, is adapted to be mounted in the region of its clamping-side end in a suction device on the machine side.

20. A drilling tool for machine tools, comprising a tool head having at least one cutting edge, a tool shank joining the tool head and adapted to be clamped in a tool holder of the machine tool with an end opposed to the tool head, at least one straight or helical chip groove formed into the surface of the shank and extending from the tool head in the direction of chip flow along at least part of the length of the shank, and a sleeve encompassing the tool shank and thereby covering the chip groove at least over a part of its length under formation of a closed chip channel, wherein the tool shank, together with the sleeve, is adapted to be mounted in the region of its clamping-side end in a suction device on the machine side.

21. The drilling tool of claim 20, wherein the tool shank comprises at least one supply channel for pressurized air and at least one of a coolant and lubricant, which channel extends up to the tool head and communicates threat in the region of the cutting edge with the chip channel.

22. The drilling tool of claim 21, wherein the at least one chip groove has a partial-circular cross section region.

23. The drilling tool of claim 20, wherein the tool head is adapted to be removed from the tool shank for mounting or exchanging the sleeve.

24. A drilling tool for machine tools, comprising a tool head having at least one cutting edge, a tool shank joining the tool head and adapted to be clamped in a tool holder of the machine tool with an end opposed to the tool head, at least one straight or helical chip groove formed into the surface of the shank and extending from the tool head in the direction of chip flow along at least part of the length of the shank, and a sleeve encompassing the tool shank and thereby covering the chip groove at least over a part of its length under formation of a closed chip channel, wherein the tool head is adapted to be removed from the tool shank for mounting or exchanging the sleeve.

25. The drilling tool of claim 24, wherein the at least one cutting edge comprises at least one of a chip breaking edge, a chip forming edge or a chip flank contour for creating short or curled chips which fit through the at least one chip channel.

26. A method for manufacturing a drilling tool of claim 1, wherein a blank of unhardened sheet metal corresponding to a development of the slotted sleeve is wound onto a mandrel geometrically corresponding to the tool shank under formation of the slotted sleeve and is resiliently hardened, and that the sleeve is pushed over the tool head under widening of the slot and clamped onto the tool shank.

27. A method for manufacturing a drilling tool of claim 1, wherein a sheet metal is formed in a non-cutting manner over a die or mandrel geometrically corresponding to the tool shank under formation of the sleeve, and that the sleeve thus formed and being provided with the slot is mounted on the tool shank.

28. The method of claim 27, wherein the sheet metal is deep-drawn or extruded.

29. A method for manufacturing a drilling tool of claim 1, wherein a pasty, hard metal-containing substance is injected into an injection mould corresponding to the sleeve, and that the sleeve thus formed and being provided with the slot is then sintered and mounted on the tool shank.

30. The method of claim 27, wherein the sleeve is cut open under formation of the slot and is resiliently hardened, and the sleeve thus formed is pushed over the tool head under widening of the slot and clamped onto the tool shank.

31. The method of claim 26, wherein the sleeve is surface coated with a pasty hard metal material and heated to cure the coating.

32. The method of one of claim 26, wherein the sleeve is glued, soldered or welded to the tool shank.

* * * * *